US012562461B2

(12) United States Patent
Xiao et al.

(10) Patent No.: US 12,562,461 B2
(45) Date of Patent: Feb. 24, 2026

(54) DISPLAY PANEL AND DISPLAY APPARATUS

(71) Applicant: Yungu (Gu'an) Technology Co., Ltd.,
Hebei (CN)

(72) Inventors: Jiangmei Xiao, Langfang (CN); Pingao Lv, Langfang (CN); Shuai Lin, Langfang (CN)

(73) Assignee: Yungu (Gu'an) Technology Co., Ltd.,
Langfang (CN)

( * ) Notice: Subject to any disclaimer, the term of this patent is extended or adjusted under 35 U.S.C. 154(b) by 369 days.

(21) Appl. No.: 18/485,555

(22) Filed: Oct. 12, 2023

(65) Prior Publication Data

US 2024/0039144 A1 Feb. 1, 2024

Related U.S. Application Data

(63) Continuation of application No. PCT/CN2022/114780, filed on Aug. 25, 2022.

(30) Foreign Application Priority Data

Dec. 31, 2021 (CN) .......................... 202111670162.2

(51) Int. Cl.
| | |
|---|---|
| *H01Q 1/24* | (2006.01) |
| *G06F 3/041* | (2006.01) |
| *G06F 3/044* | (2006.01) |

(52) U.S. Cl.
CPC .......... *H01Q 1/243* (2013.01); *G06F 3/0412* (2013.01); *G06F 3/04164* (2019.05); *G06F 3/0443* (2019.05); *G06F 2203/04107* (2013.01)

(58) Field of Classification Search
CPC . G06F 2203/04107; G06F 3/044–0448; G06F 3/04164
See application file for complete search history.

(56) References Cited

U.S. PATENT DOCUMENTS

| | | | | |
|---|---|---|---|---|
| 10,990,234 | B2 * | 4/2021 | Kim | G06F 3/04182 |
| 11,340,722 | B2 * | 5/2022 | Oh | G06F 3/0446 |
| 11,366,559 | B2 * | 6/2022 | Oh | H01Q 9/045 |
| 11,462,823 | B2 * | 10/2022 | Oh | H01Q 1/38 |
| 11,509,049 | B2 * | 11/2022 | Oh | H01Q 1/243 |

(Continued)

FOREIGN PATENT DOCUMENTS

| | | |
|---|---|---|
| CN | 102751309 A | 10/2012 |
| CN | 203299776 U | 11/2013 |

(Continued)

OTHER PUBLICATIONS

Office Action issued Sep. 10, 2024, in corresponding Japanese Application No. 2023-567062, 15 pages.

(Continued)

*Primary Examiner* — Patrick F Marinelli
(74) *Attorney, Agent, or Firm* — Maier & Maier, PLLC

(57) ABSTRACT

A display panel and a display apparatus, and the display panel includes a display area and a non-display area located on at least one side of the display area. The display panel includes: a substrate; and antenna modules arranged at a side of the substrate. An orthographic projection of at least one of the antenna modules on the substrate is located within a line winding area of the non-display area.

14 Claims, 9 Drawing Sheets

(56)     References Cited

U.S. PATENT DOCUMENTS

| | | | | |
|---|---|---|---|---|
| 11,662,782 B2* | 5/2023 | Oh | G06F 3/0412 | |
| | | | 345/156 | |
| 11,728,562 B2* | 8/2023 | Sung | H01Q 1/243 | |
| | | | 343/848 | |
| 11,747,869 B2* | 9/2023 | Lee | G06F 1/1637 | |
| | | | 345/173 | |
| 11,782,544 B2* | 10/2023 | Huh | H01Q 1/38 | |
| | | | 345/173 | |
| 11,793,052 B2* | 10/2023 | Sung | H10K 59/40 | |
| | | | 345/173 | |
| 11,816,917 B2* | 11/2023 | Kim | G06F 3/0446 | |
| 12,019,324 B2* | 6/2024 | Wang | H01Q 1/22 | |
| 12,034,229 B2* | 7/2024 | Lee | H01Q 5/50 | |
| 12,040,533 B2* | 7/2024 | Kim | H01Q 1/44 | |
| 12,056,319 B2* | 8/2024 | Kim | H10K 77/111 | |
| 12,079,416 B2* | 9/2024 | Lee | H04B 7/0602 | |
| 12,099,670 B2* | 9/2024 | Choi | H01Q 1/243 | |
| 12,393,237 B2* | 8/2025 | Lee | G06F 1/1643 | |
| 12,393,294 B2* | 8/2025 | Kim | H01Q 1/243 | |
| 12,402,510 B2* | 8/2025 | Sung | G06F 3/0412 | |
| 12,416,986 B2* | 9/2025 | Lee | G06F 3/0412 | |
| 2012/0086669 A1* | 4/2012 | Kim | G06F 3/0445 | |
| | | | 345/174 | |
| 2014/0043261 A1 | 2/2014 | Wang et al. | | |
| 2014/0132463 A1 | 5/2014 | Hobson et al. | | |
| 2020/0067176 A1* | 2/2020 | Kim | H01Q 1/38 | |
| 2020/0201470 A1* | 6/2020 | Oh | H01Q 1/44 | |
| 2020/0227819 A1* | 7/2020 | Oh | H04M 1/0266 | |
| 2020/0343314 A1 | 10/2020 | Nakamura et al. | | |
| 2020/0379607 A1* | 12/2020 | Oh | H01Q 21/065 | |
| 2021/0132736 A1* | 5/2021 | Kim | H10K 50/844 | |
| 2021/0247871 A1* | 8/2021 | Kim | H01Q 1/44 | |
| 2022/0083172 A1* | 3/2022 | Kim | G06F 3/0443 | |
| 2022/0109229 A1* | 4/2022 | Kim | H01Q 1/364 | |
| 2022/0137741 A1* | 5/2022 | Choi | G06F 3/04164 | |
| | | | 345/156 | |
| 2022/0375997 A1* | 11/2022 | Sung | G06F 3/0412 | |
| 2023/0176630 A1* | 6/2023 | Lee | G06F 3/04164 | |
| | | | 345/173 | |
| 2023/0176673 A1* | 6/2023 | Choi | G06F 3/0412 | |
| | | | 345/173 | |
| 2023/0307819 A1* | 9/2023 | Kim | H01Q 21/08 | |

| | | | | |
|---|---|---|---|---|
| 2023/0400942 A1* | 12/2023 | Lee | G06F 3/0446 | |
| 2024/0008339 A1* | 1/2024 | Sung | H10K 50/84 | |
| 2024/0039144 A1* | 2/2024 | Xiao | G06F 3/0446 | |

FOREIGN PATENT DOCUMENTS

| | | |
|---|---|---|
| CN | 105094231 A | 11/2015 |
| CN | 105224136 A | 1/2016 |
| CN | 106547382 A | 3/2017 |
| CN | 111045548 A | 4/2020 |
| CN | 111381712 A | 7/2020 |
| CN | 111413815 A | 7/2020 |
| CN | 111525232 A | 8/2020 |
| CN | 112083826 A | 12/2020 |
| CN | 112578924 A | 3/2021 |
| CN | 112578925 A | 3/2021 |
| CN | 112578928 A | 3/2021 |
| CN | 110442250 B | 6/2021 |
| CN | 113629039 A | 11/2021 |
| CN | 113646738 A | 11/2021 |
| CN | 114327146 A | 4/2022 |
| JP | 2018033031 A | 3/2018 |
| JP | 2019068412 A | 4/2019 |
| JP | 2020201486 A | 12/2020 |
| KR | 102262747 B1 | 6/2021 |
| TW | 201642105 A | 12/2016 |
| TW | 201714057 A | 4/2017 |
| WO | 2017006770 A1 | 1/2017 |

OTHER PUBLICATIONS

International Search Report issued Nov. 10, 2022, in corresponding International Application No. PCT/CN2022/114780, 4 pages.
Office Action issued on Jan. 18, 2023, in corresponding Chinese Application No. 202111670162.2, 12 pages.
Office Action issued on Jul. 24, 2023, in corresponding Chinese Application No. 2021116701622, 6 pages
Reexamination Decision issued on Jul. 21, 2023, in corresponding Chinese Application No. 202111670162.2, 2 pages
Rejection Decision issued Mar. 30, 2023, in corresponding Chinese Application No. 202111670162.2, 10 pages
Office Action issue Jul. 7, 2023, in corresponding Taiwanese Application No. 111133953, 9 pages.
Extended Search Report issued on Mar. 31, 2025, in corresponding European Application No. 22913433.3, 13 pages.

* cited by examiner

DISPLAY PANEL AND DISPLAY APPARATUS

CROSS-REFERENCE TO RELATED APPLICATION

This application is a continuation of International Patent Application No. PCT/CN2022/114780, filed on Aug. 25, 2022, which claims priority to Chinese Patent Application No. 202111670162.2 filed on Dec. 31, 2021, disclosure of which are incorporated herein by reference in their entireties.

TECHNICAL FIELD

The present application relates to the technical field of display devices, and in particular, to a display panel and a display apparatus.

BACKGROUND

Currently, an electronic device (for example, a cell phone, a smart watch, and the like) is constantly changing. Taking the cell phone as an example, people's requirements for appearance and wireless performance of the cell phone are also constantly increasing. A cell phone has started to have two or four cameras, and have a function of multiple continuous zooming; and a large screen cell phone with a full screen and a high screen-to-body ratio is also getting popular. In addition, as requirements for the antenna performance increase, arranging an antenna within a panel is a trend for technology in the future. However, the internal space of the display panel is limited, and how to arrange an antenna within the limited space becomes an urgent technical problem to be solved.

SUMMARY

Embodiments of the present application provide a display panel and a display apparatus, and aim to solve the problem of how to arrange the antenna within the limited space.

Embodiments of a first aspect of the present application provide a display panel including a display area and a non-display area located on at least one side of the display area, the display panel includes: a substrate; and antenna modules arranged at a side of the substrate, wherein an orthographic projection of at least one of the antenna modules on the substrate is located within a line winding area of the non-display area.

Embodiments of a second aspect of the present application further provide a display apparatus including the display panel according to any of the embodiments of the first aspect.

In the display panel according to the embodiments of the present application, the display panel includes the substrate and the antenna modules arranged at the substrate. At least one of the antenna modules is located within the line winding area of the non-display area, and no space is required to be additionally reserved for arranging the antenna module, so that the space occupied by the antenna modules can be reduced, thereby reducing the size of the non-display area. Under a condition that the display panel is used in the display apparatus, the size of the upper frame of the display apparatus can be reduced, thereby improving the screen-to-body ratio.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features.

DETAILED DESCRIPTION

Figure 1:
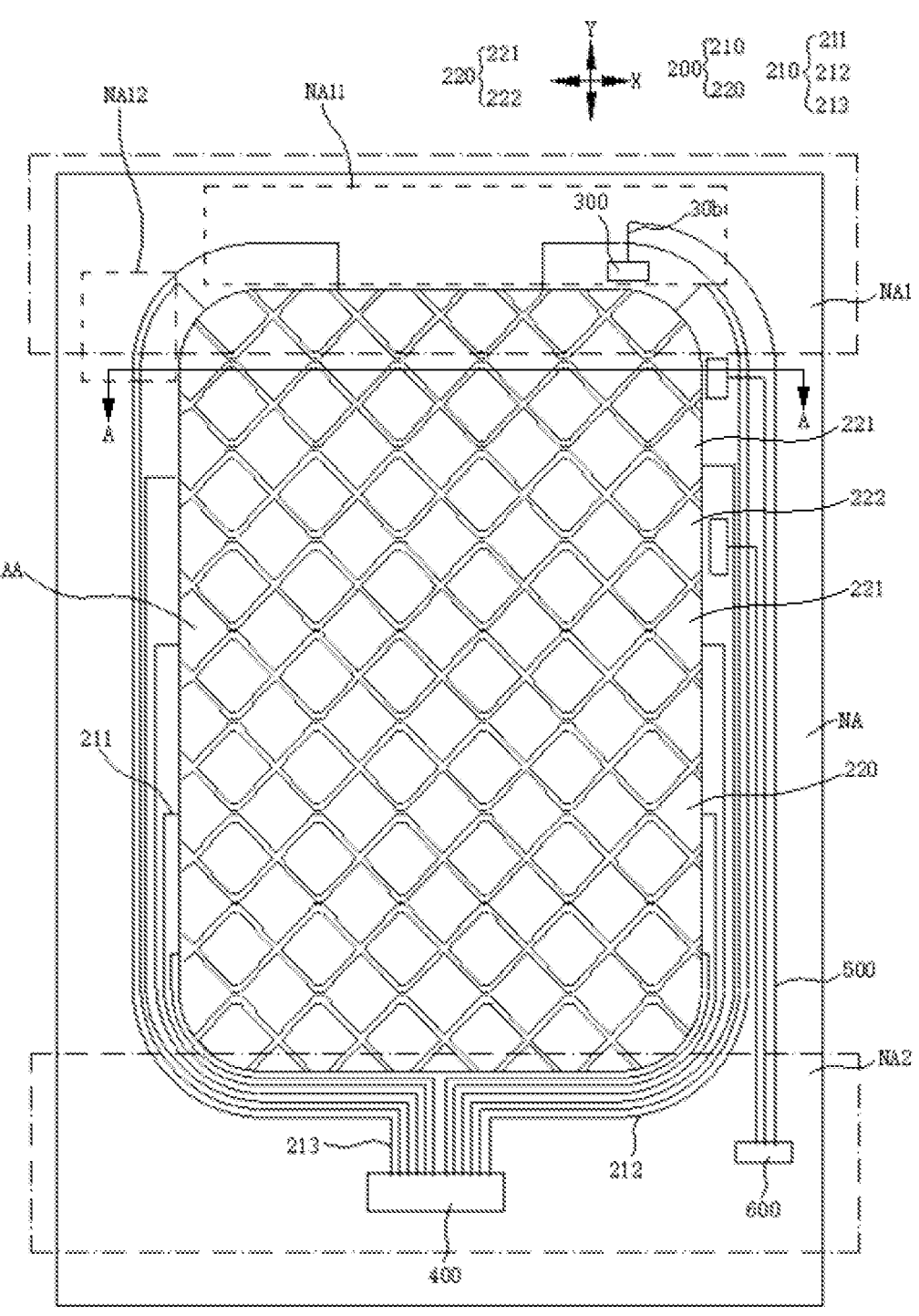
FIG. 1 is a schematic structural view of a display panel according to an embodiment of a first aspect of the present application.

Features and exemplary embodiments of various aspects of the present application will be described in detail below. Numerous specific details are set forth in the following detailed description so as to provide a thorough understanding of the present application. However, it will be apparent to a person skilled in the art that the present application may be practiced without some of these specific details. The following description of the embodiments is merely to provide a better understanding of the present application by illustrating examples of the present application. In the drawings and the following description, at least some of well-known structures and techniques have not been shown so as to avoid unnecessary obscurity of the present application. In addition, size of some structures may be exaggerated for clarity. Furthermore, the features, structures, or characteristics described below may be combined in one or more embodiments by any suitable manner.

For a better understanding of the present application, a display panel and a display apparatus according to the embodiments of the present application will be described in detail below with reference to FIG. 1 to FIG. 14.

Figure 2:
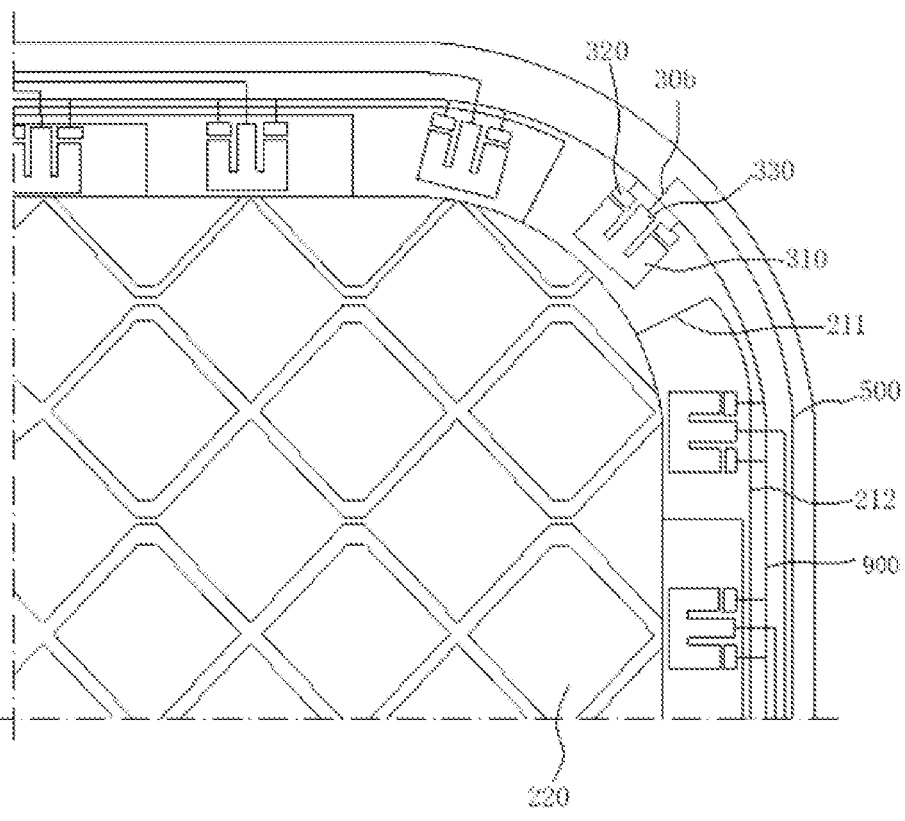
FIG. 2 is a partial enlarged schematic structural view of FIG. 1.
Figure 3:
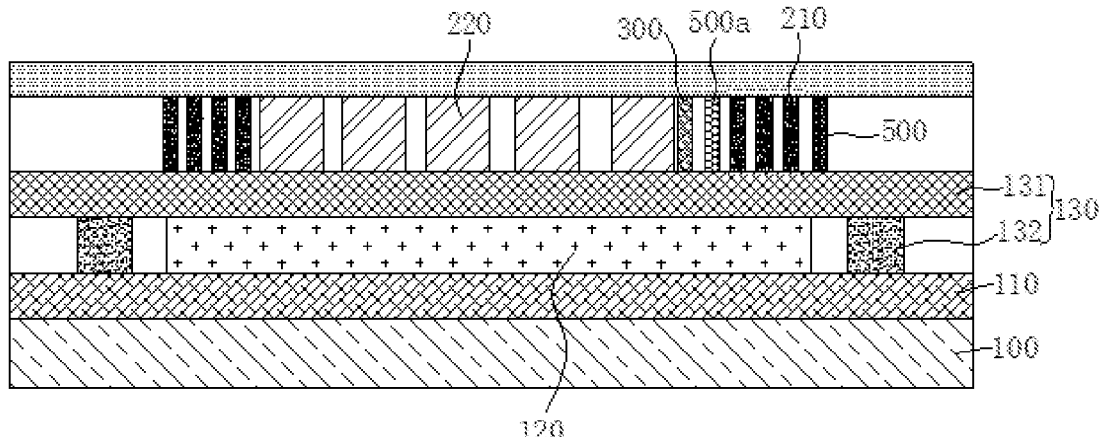
FIG. 3 is a partial sectional view at A-A in FIG. 1.

With reference to FIG. 1 to FIG. 3, FIG. 1 is a schematic structural view of a display panel according to an embodiment of the first aspect of the present application. FIG. 2 is a partial enlarged schematic structural view of FIG. 1, and FIG. 3 is a partial sectional view at A-A in FIG. 1.

As shown in FIG. 1 to FIG. 3, the display panel according to the embodiments of the first aspect of the present application includes a display area AA and a non-display area NA located on at least one side of the display area AA. The display panel includes: a substrate 100; and antenna modules 300 arranged at a side of the substrate 100, wherein an orthographic projection of at least one of the antenna modules 300 on the substrate is located within a line winding area of the non-display area NA.

Herein, the line winding area of the non-display area NA is formed by wiring of signal lines of the display panel in the non-display area NA. Under a condition that the display panel includes a touch module 200, and the touch module 200 includes touch lines 210 located in the non-display area NA, the signal lines may be the touch lines 210. In some other embodiments, the signal lines may also be other signal lines, such as ground wires or the like.

The line winding area is located between the display area AA and the outer frame of the non-display area. A width of the line winding area refers to a distance between a part of the signal lines farthest away from the display area AA and the display area AA, that is, the width of the line winding area refers to a maximum distance between the signal lines and the display area AA. Under a condition that the line winding area is formed by the touch lines 210, the width of the line winding area refers to a maximum distance between an orthographic projection of the touch lines 210 on the substrate and the display area AA. Under a condition that the line winding area is formed by array lines, the width of the line winding area refers to a maximum distance between an orthographic projection of the array lines on the substrate and the display area AA. Under a condition that the line winding area is formed by the touch lines 210 and the array lines together, the width of the line winding area refers to a maximum distance between an orthographic projection of the signal lines (including the touch lines and the array lines) on the substrate and the display area AA.

In the display panel according to the embodiments of the present application, the display panel includes the substrate 100 and the antenna modules 300 arranged at the substrate 100. An orthographic projection of at least one of the antenna modules 300 on the substrate is arranged within the line winding area formed by the non-display area NA, and no space is required to be additionally reserved for arranging the antenna module 300, so that the space occupied by the antenna modules 300 can be reduced, thereby reducing the size of the non-display area NA. Under a condition that the display panel is used in the display apparatus, the size of the upper frame of the display apparatus can be reduced, thereby improving the screen-to-body ratio.

In some optional embodiments, with further reference to FIG. 1 to FIG. 3, the display panel further includes a touch module 200 arranged at a side of the substrate 100 and including a plurality of touch lines 210 located in the non-display area NA, and the line winding area includes a touch line winding area formed by wiring of the touch lines 210 in the non-display area NA, and the orthographic projection of at least one of the antenna modules 300 on the substrate is located within the touch line winding area.

Herein, distances from edges of the touch line winding area away from the display AA to the display area AA are the same, that is, the touch line winding area is arranged in an equal-width manner, and a width of the touch line winding area refers to a distance between a part of the touch lines 210 farthest away from the display area AA and the display area AA, that is, the width of the touch line winding area refers to a maximum distance between the touch lines 210 and the display area AA.

Optionally, the antenna modules 300 are arranged on the substrate 100. The touch module 200 and the antenna modules 300 are arranged on the substrate 100, which does not mean that the touch module 200 and the antenna modules 300 are directly arranged on the surface of the substrate 100, but means that other film layer(s) may be arranged between the touch module 200 and the substrate 100, and other film layer(s) may also be arranged between the antenna modules 300 and the substrate 100.

In the display panel according to the embodiments of the present application, the display panel includes the substrate 100 and the touch module 200 and the antenna modules 300 arranged on the substrate 100. The orthographic projection of at least one of the antenna modules 300 on the substrate is located within the touch line winding area formed by the touch lines 210 in the non-display area NA, and no space is required to be additionally reserved for arranging the antenna module 300, so that the space occupied by the antenna modules 300 and the touch module 200 can be reduced, thereby reducing the size of the non-display area NA.

Optionally, the orthographic projection of at least one of the antenna modules 300 on the substrate is located within an array line winding area formed by the array lines in the non-display area NA, no space is required to be additionally reserved for arranging the antenna module 300, so that the space occupied by the antenna modules 300 and the array lines can be reduced, thereby reducing the size of the non-display area NA. Under a condition that the display panel is used in the display apparatus, the size of the upper frame of the display apparatus can be reduced, thereby improving the screen-to-body ratio.

In some embodiments, the touch module 200 further includes electrode blocks 220 located in the display area AA, the orthographic projection of at least one of the antenna modules 300 on the substrate 100 is located between orthographic projections of two adjacent ones of the touch lines 210 on the substrate 100, the orthographic projection of at least one of the antenna modules 300 on the substrate 100 is located between an orthographic projection of the electrode blocks 220 on the substrate 100 and an orthographic projection of the touch lines 210 on the substrate 100.

As shown in FIG. 1 and FIG. 2, under a condition that the orthographic projection of at least one of the antenna modules 300 on the substrate 100 may be located within an area formed by an angle included between an orthographic projection of the electrode blocks 220 on the substrate 100 and an orthographic projection of a part of the touch lines 210 on the substrate 100, or the orthographic projection of at least one of the antenna modules 300 on the substrate 100 may be located between orthographic projections of two adjacent ones of the touch lines 210 on the substrate 100, the orthographic projection of at least one of the antenna modules 300 on the substrate 100 and an orthographic projection of at least a part of the touch lines 210 on the substrate 100 are arranged at intervals along a circumferential direction of the display area AA. That is, the orthographic projection of at least one of the antenna modules 300 on the substrate 100 and the orthographic projection of at least a part of the touch lines 210 on the substrate 100 are arranged at intervals along an extending direction of the edge of the display area AA.

The antenna modules 300 may be arranged in various ways. With further reference to FIG. 2, the antenna module 300 includes a radiation electrode 310, ground terminals 320 arranged on the radiation electrode 310 and a transmission terminal 330, the transmission terminal 330 and the radiation electrode 310 are electrically connected with each other, and the transmission terminal 330 is configured for transmitting a signal. Optionally, two ground terminals 320 are arranged on one antenna module 300, and the two ground terminals 320 are respectively arranged on two sides of the transmission terminal 330.

Optionally, the display panel further includes a ground wire 900, and the antenna module 300 may be connected with the ground wire 900. For example, the ground terminals 320 of the antenna module 300 are connected with the ground wire 900. Optionally, the ground wire 900 is arranged around the display area AA. Optionally, ground terminals 320 of a plurality of antenna modules 300 are connected with the same ground wire 900. Optionally, the orthographic projection of the antenna module 300 on the substrate 100 is located between the ground wire 900 and the display area AA, that is, the antenna module 300 is located within the line winding area formed by the ground wire 900 around the display area AA.

In some optional embodiments, with reference to FIG. 1 to FIG. 4, the display panel further includes a touch pad 400 located in the non-display area NA; the touch lines 210 includes first connection segments 211, second connection segments 213, and wiring segments 212 located between the first connection segments 211 and the second connection segments 213, the electrode blocks 220 includes touch electrode blocks 221, the first connection segments 211 are connected with the touch electrode blocks 221, and the second connection segments 213 are connected with the touch pad 400.

Figure 4:
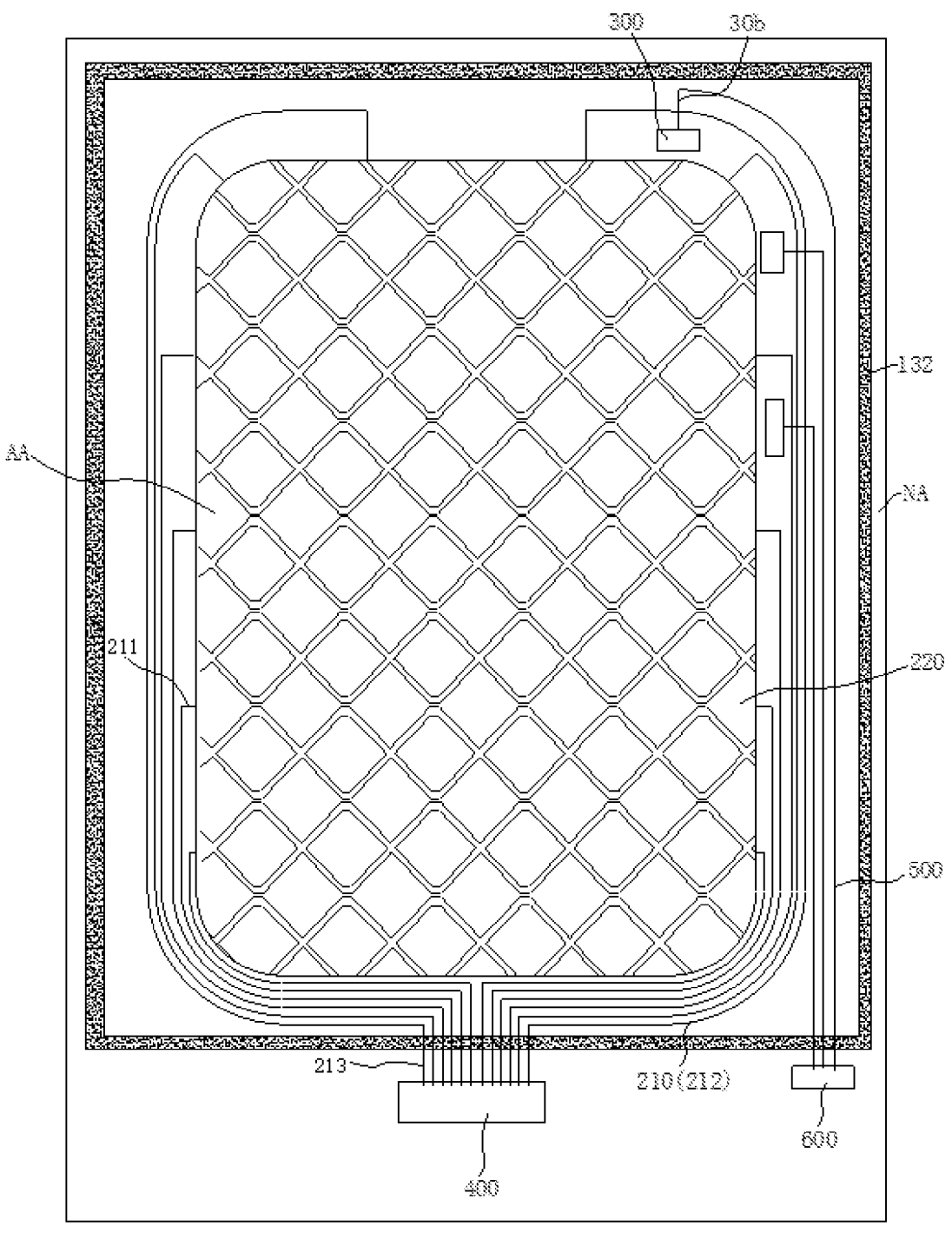
FIG. 4 is a schematic structural view of a display panel according to another embodiment of the first aspect of the present application.

With further reference to FIG. 2 to FIG. 4, in some optional embodiments, an orthographic projection of at least a part of the antenna modules 300 on the substrate 100 is located between orthographic projections of two adjacent ones of the first connection segments 211 or the second connection segments 213 on the substrate 100.

The two adjacent ones of the first connection segments 211 or the second connection segments 213 refer to two adjacent ones of the first connection segments 211, or two adjacent ones of the second connection segments 213, or two adjacent ones of the first connection segments 211 and two adjacent ones of the second connection segments 213.

In these optional embodiments, an corner area is generally formed between the first connection segment 211 and the wiring segment 212, and an corner area is also formed between the wiring segment 212 and the second connection segment 213, and the size of the corner area is relatively great, so that arranging the antenna modules 300 in the area can reduce the effect of the antenna modules 300 on the wiring of the touch lines.

In some optional embodiments, the orthographic projection of at least one of the antenna modules 300 on the substrate 100 is located between the display area AA and the orthographic projection of the wiring segments 212 on the substrate 100, that is, the orthographic projection of at least one of the antenna modules 300 on the substrate is located in the touch line winding area, so that the size of the frame area of the display panel can be further reduced.

In some optional embodiments, the electrode blocks 220 further include at least one spacer electrode block 222 located between touch electrode blocks 221 corresponding to two first connection segments 211 that are at least partially adjacent to each other, and the orthographic projection of at least a part of the antenna modules 300 on the substrate 100 is located at a side of the at least one spacer electrode block 222 facing the non-display area NA. The touch electrode blocks 221 corresponding to two adjacent first connection segments 211 refer to touch electrode blocks 221 with which two adjacent first connection segments 211 are respectively connected.

In these optional embodiments, the wiring of the touch lines 210 is adjusted, so that at least one spacer electrode block 222 can be formed between touch electrode blocks 221 corresponding to two adjacent first connection segments 211. At a side where the two adjacent first connection segments 211 are located, the touch lines 210 are not arranged on the spacer electrode block 222, so that the space corresponding to the spacer electrode block 222 between the two adjacent first connection segments 211 is relatively great, so as to provide a sufficient space for arranging the antenna modules 300.

In some optional embodiments, the orthographic projection of at least a part of the antenna modules 300 on the substrate 100 is located between an orthographic projection of the at least one spacer electrode block 222 on the substrate 100 and the orthographic projection of the wiring segments 212 on the substrate 100, so that the arrangement of the antenna modules 300 does not affect the wiring of the wiring segments 212.

Optionally, a plurality of first connection segments 211 are arranged at intervals around the display area AA along the circumferential direction. A gap for arranging the antenna modules 300 can be formed between two adjacent first connection segments 211 along the circumferential direction.

Optionally, with further reference to FIG. 1 to FIG. 4, the touch pad 400 is arranged at a side of the display area AA along a first direction Y, and a plurality of touch pads 400 are arranged side by side along a second direction X. Accordingly, a plurality of second connection segments 213 are arranged side by side along the second direction X, and are located at a side of the display area AA along the first direction Y.

Optionally, the non-display area NA includes a first sub-area NA1 and a second sub-area NA2 arranged oppositely along the first direction Y, and the touch control pad 400 and the second connection segments 213 are located in the second sub-area NA2; and a plurality of second connection segments 213 are arranged side by side along the second direction X, so that regular gaps can be formed between adjacent second connection segments 213.

Optionally, there are a plurality of touch electrode blocks 221, and each touch electrode block 221 is connected with the first connection segment 211. The touch electrode blocks 221 are located in different positions of the display area AA, and a plurality of first connection segments 211 are distributed at intervals around the display area AA, so as to connect respective touch electrode blocks 221. As shown in FIG. 1, along a direction from the second sub-area NA2 to the first sub-area NA1, the number of the touch lines 210 becomes smaller and smaller, and the number of the wiring segments 212 becomes smaller and smaller, so that the gap between two adjacent first connection segments 211 becomes greater and greater. At least one of the antenna modules 300 may be correspondingly arranged between two adjacent first connection segments 211 with a relatively great gap, so as to reduce the effect of the antenna modules 300 on the wiring of the touch lines 210.

With further reference to FIG. 1 and FIG. 4, the wiring segments 212 are arranged around the display area AA. Lengths of a plurality of wiring segments 212 may be different. For example, under a condition that the distance between the first connection segment 211 and the second connection segment 213 is relatively short, the length of the wiring segment 212 is relatively short. Since the touch pad 400 is arranged in the second sub-area NA2, the closer to the second sub-area NA2, the greater the number of the wiring segments 212 is. Accordingly, at a side away from the second sub-area NA2, both the number of the wiring segments 212 and the number of the first connection segments 211 are relatively small, which causes that there is a gap between adjacent first connection segments 211, or there is a gap between the display area AA and the wiring segment 212.

In some optional embodiments, with further reference to FIG. 1, the non-display area NA includes the first sub-area NA1 and the second sub-area NA2 arranged oppositely along the first direction Y, the second connection segments 213 are located in the second sub-area NA2, and the antenna modules 300 are located in the first sub-area NA1. Although the first sub-area NA1 and the second sub-area NA2 are shown in rectangular dot-dash line boxes in FIG. 1, the dot-dash lines do not constitute a structural limitation of the embodiments according to the present application, the dot-dash lines only show positions of the first sub-area NA1 and the second sub-area NA2, and the first sub-area NA1 and the second sub-area NA2 are non-display areas NA within the rectangular dot-dash line boxes.

In these optional embodiments, the second connection segments 213 are located in the second sub-area NA2, then the closer to the second sub-area NA2, the denser the wiring segments 212, and the smaller the size of the gap between the wiring segment 212 and the display area AA. The further away from the second sub-area NA2, the more sparse the wiring segments 212, the greater the size of the gap between the wiring segment 212 and the display area AA, and the greater the distance between two adjacent first connection segments 211. The antenna modules 300 are arranged in the first sub-area NA1, so that, on one hand, more space can be reserved for arranging the antenna modules 300, so as to facilitate the arrangement of the antenna modules 300, and on the other hand, densities of metal wiring in the first sub-area NA1 and metal wiring in the second sub-area NA2 can be more consistent, thereby improving the consistency of the density of the wiring on the display panel.

The first sub-area NA1 may be arranged in various ways. For example, the first sub-area NA1 is a bar-shaped structure extending along the second direction X, that is, the first sub-area NA1 is located at a side of the display area AA along the first direction Y, and the antenna modules 300 are arranged at a side of the display area AA along the first direction Y.

In some other optional embodiments, with further reference to FIG. 1, the first sub-area NA1 includes a first area section NA11 and a second area section NA12 intersecting with each other, the first area section NA11 is located at a side of the display area AA along the first direction Y, and the second area section NA12 is located on at least one side of the display area AA along the second direction X. The antenna modules 300 are located in the first area section NA11 and/or the second area section NA12. Only one second area section NA12 is shown in FIG. 1. Optionally, two second area sections NA12 are located at two sides of the display area AA along the second direction X.

Optionally, the antenna modules 300 are located at a side of the first area section NA11 close to the second area section NA12, and/or the antenna modules 300 are located at a side of the second section NA12 close to the first area section NA11, that is, the antenna modules 300 are located close to the corner area of the non-display area NA. In these optional embodiments, the first sub-area NA1 is located in the corner area of the display panel. Generally, the density of the touch lines 210 in the area is relatively small, and a gap between the wiring segment 212 and the display area AA is relatively great, so that more space can be reserved for arranging the antenna modules 300.

Optionally, there are two first sub-areas NA1, the two first sub-areas NA1 are arranged at intervals along the second direction X, and second area sections NA12 of the two first sub-areas NA1 are arranged at two sides of the display area AA along the second direction X.

In these optional embodiments, on one hand, the antenna modules 300 are arranged more uniformly, and on the other hand, the consistency of the density of the wiring on the display panel can be further improved, and a gap between the touch lines 210 and a gap between the touch lines 210 and the display area AA can be better utilized.

In some optional embodiments, with reference to FIG. 1 to FIG. 4, the antenna modules 300 may be arranged in various ways in the display panel. Optionally, at least one of the antenna modules 300 are arranged in a layer where the touch module 200 is located, that is, the touch module 200 and at least a part of the antenna modules 300 are arranged in a same layer, so that the touch module 200 and the antenna modules 300 can be manufactured together, the manufacturing of the antenna modules 300 can be simplified, and the efficiency of manufacturing the display panel can be increased.

The electrode blocks 220 and the touch lines 210 of the touch module 200 may be arranged in a same layer or in different layers.

Optionally, the electrode blocks 220 and the touch lines 210 are arranged in a same layer, and the electrode blocks 220, the touch lines 210 and at least one of the antenna modules 300 are arranged in a same layer, so that the antenna module 300, the electrode blocks 220 and the touch lines 210 can be manufactured at the same time in a same process step, and the efficiency of manufacturing the display panel can be further increased.

Optionally, the electrode blocks 220 and the touch lines 210 are arranged in different layers, and at least one of the antenna modules 300 is arranged in a same layer as the electrode blocks 220 or the touch lines 210. For example, the electrode blocks 220 and at least one of the antenna modules 300 may be arranged in a same layer. Alternatively, the touch lines 210 and at least one of the antenna modules 300 may be arranged in a same layer. Alternatively, the electrode blocks 220 and at least one of the plurality of antenna modules 300 are arranged in a same layer, and the touch lines 210 and at least the other one of the plurality of antenna modules 300 are arranged in a same layer.

In some optional embodiments, with further reference to FIG. 3 and FIG. 4, the display panel includes an array base plate layer 110 arranged on the substrate 100 and a light-emitting layer located at a side of the array base plate layer 110 away from the substrate 100. The array base plate layer 110 includes a driving circuit, the light-emitting layer includes a light-emitting unit 120, and the driving circuit of the array base plate layer 110 is configured to drive the light-emitting unit 120 of the light-emitting layer to emit light. The display panel further includes an encapsulation layer 130 configured for sealing the light-emitting unit 120, and the encapsulation layer 130 is arranged at a side of the light-emitting layer away from the array base plate layer 110. The encapsulation layer 130 is configured for providing protection for the light-emitting layer, so as to prevent the light-emitting unit 120 from being intruded by water and oxygen and thus to avoid affecting the yield of the display panel. The encapsulation layer 130 may be a thin film encapsulation, a glass encapsulation, or the like. Alternatively, the encapsulation layer 130 may include an encapsulation cover plate 131 and a ring-shaped encapsulation part 132. The display panel further includes the touch module 200 located at a side of the encapsulation layer 130 away from the light-emitting layer, and includes a polarizer located at a side of the touch module 200 away from the encapsulation layer 130.

The antenna modules 300 may be arranged in various ways in the display panel. Optionally, at least one of the antenna modules 300 is arranged within at least one film layer in the display panel; and/or the antenna modules 300 are arranged between any two adjacent film layers in the display panel, that is, the antenna modules 300 may be arranged between the substrate 100 and the array base plate layer 110, and/or the antenna modules 300 may be arranged between the layer where the polarizer is located and the layer where the touch module 200 is located, and/or the antenna module 300 may be arranged between the encapsulation layer 130 and the layer where the touch module 200 is located. Under a condition that the encapsulation layer 130 is a thin film encapsulation and includes two or more organic layers and inorganic layers arranged alternately, at least one of the antenna modules 200 may be located between adjacent ones of the organic layers and inorganic layers within the encapsulation layer 130.

The encapsulation layer 130 includes the encapsulation cover plate 131 and the ring-shaped encapsulation part 132 arranged at a side of the encapsulation cover plate 131 facing the light-emitting unit 120, and the antenna modules 300 are correspondingly located within the ring-shaped encapsulation part 132. The position of the ring-shaped encapsulation part 132 is shown in FIG. 4.

In these optional embodiments, the antenna modules 300 are correspondingly located within the ring-shaped encapsulation part 132, and under a condition that the ring-shaped encapsulation part 132 and a glass cover plate are connected with each other using a high-temperature process such as sintering, the effect of the high temperature on the antenna modules 300 can be reduced, and the effect of the antenna modules 300 on the energy used in sintering can also be reduced.

In other embodiments, the antenna modules 300 and the touch module 200 may be located at a side of the encapsulation layer 130 away from the substrate 100.

Optionally, the display panel further includes a protection layer located at a side of the touch module 200 and the antenna modules 300 away from the substrate 100, and a protection may be provided for the antenna modules and the touch module 200 through the protection layer.

With further reference to FIG. 1 to FIG. 5, and FIG. 5 is a partial enlarged schematic structural view of FIG. 1 according to an embodiment of the first aspect of the present application.

In some optional embodiments, the display panel further includes antenna lines 500 and an antenna pad 600, and the antenna modules 300 are connected with the antenna pad 600 through the antenna lines 500.

Figure 5:
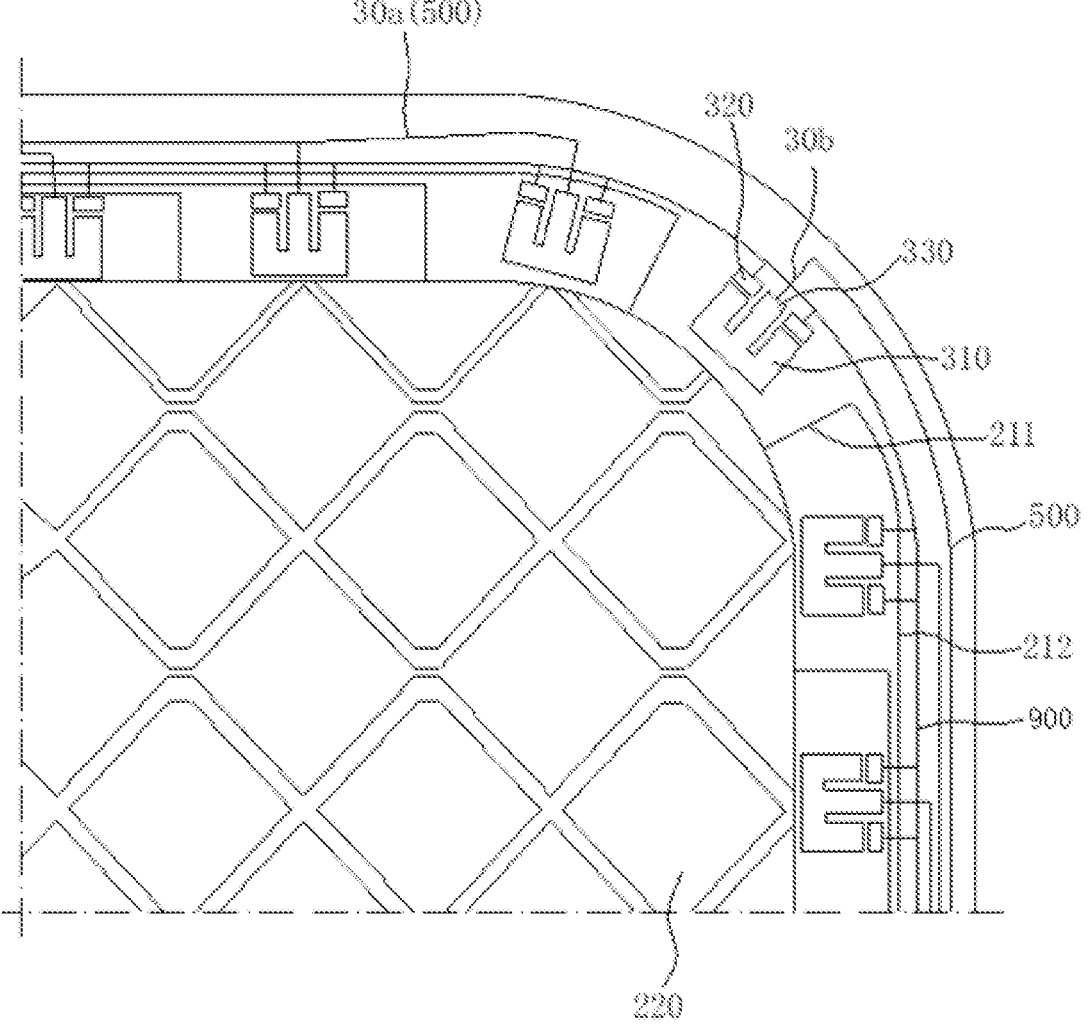
FIG. 5 is a partial enlarged schematic structural view of FIG. 1 according to an embodiment of the first aspect of the present application.

In some optional embodiments, as shown in FIG. 5, at least two or more of the plurality of antenna modules 300 are connected in series with each other. In these optional embodiments, two or more of the antenna modules 300 are connected in series with each other to be able to act as an antenna with a relatively great power. Optionally, two or more of the antenna modules 300 may be connected in series with each other through serial lines 30*a*.

The antenna modules 300 may be connected in series with each other in various ways. As described above, with further reference to FIG. 5, two of the antenna modules 300 may be connected in series with each other by connecting with the same antenna line 500, that is, the antenna line 500 is reused as the serial line 30*a*.

Figure 6:
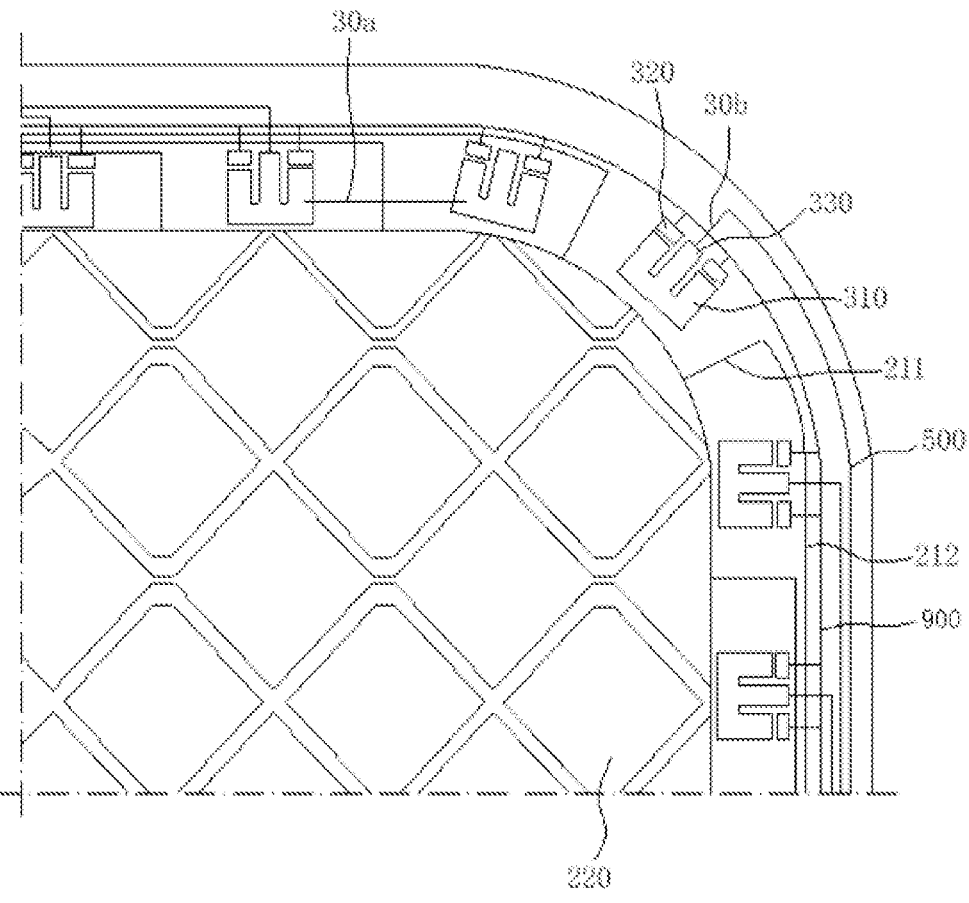
FIG. 6 is a partial enlarged schematic structural view of FIG. 1 according to another embodiment of the first aspect of the present application.

With reference to FIG. 6, which is a partial enlarged schematic structural view of FIG. 1 according to another embodiment of the first aspect of the present application.

In some other optional embodiments, as shown in FIG. 6, two or more of the antenna modules 300 are connected with each other through the serial lines 30*a*, that is, two or more of the antenna modules 300 may be connected in series with each other through the serial lines 30*a*, and any of the two or more of the antenna modules 300 connected in series with each other is connected with the antenna line 500, so that the wiring of the display panel can be further simplified, the manufacturing of the display panel can be simplified, and the yield of the display panel can be improved. For example, the serial line 30*a* is connected between transmission terminals 330 of two antenna modules 300 connected in series with each other, or radiation electrodes 310 of two antenna modules 300 connected in series with each other are connected with each other through the serial line 30*a*.

In some optional embodiments, as shown in FIG. 5 and FIG. 6, an orthographic projection of at least a part of the antenna lines 500 on the substrate 100 is at least partially staggered with the orthographic projection of the touch lines 210 on the substrate 100, so as to avoid a crosstalk between an antenna signal and a touch signal.

Optionally, as shown in FIG. 5 and FIG. 6, the antenna lines 500 are located at a side of the touch lines 210 away from the display area AA. Optionally, the antenna pad 600 and the touch pad 400 are arranged at a same side of the display area AA, and a plurality of antenna pads 600 are arranged side by side along the second direction X.

In these optional embodiments, the antenna lines 500 are arranged at a side of the touch lines 210 away from the display area AA, that is, the antenna lines 500 are arranged at a side of the wiring segments 212 away from the display area AA, so that the antenna lines 500 do not intersect with the plurality of first connection segments 211, a signal transmission stability can be improved, and the wiring of the display panel can be simplified, thereby improving the yield of the display panel.

In some other embodiments, the antenna lines 500 may also be located at a side of at least one of the touch lines 210 facing the display area AA.

Optionally, the antenna lines 500 and the touch lines 210 are arranged in a same layer and made of a same material, so that a process for manufacturing the display panel can be simplified, and the efficiency of manufacturing the display panel can be increased. In other embodiments, the antenna lines 500 and the touch lines 210 may be arranged in different layers.

As shown in FIG. 5 and FIG. 6, in some optional embodiments, the antenna modules 300 are connected with the antenna lines 500 through antenna bridges 30*b*.

Optionally, in order to achieve an interconnection between the antenna modules 300 and the antenna lines 500, the display panel further includes antenna bridges 30b, one end of the antenna bridge 30b is connected with the antenna module 300, the other end of the antenna bridge 30b is connected with the antenna line 500, an orthographic projection of the antenna bridges 30b on the substrate 100 intersects with an orthographic projection of at least one of the touch lines 210 on the substrate 100.

Optionally, the transmission terminals 330 of the antenna modules 300 are connected with the antenna lines 500 through the antenna bridges 30b. The antenna bridges 30b intersect with the touch lines 210, so that the antenna bridges 30b and the touch lines 210 are arranged in different layers. Optionally, the antenna bridges 30b and the electrode blocks 220 are arranged in a same layer, so that the layer structure of the display panel can be simplified, the display panel can be thinned, and the efficiency of manufacturing the display panel can be increased.

In some optional embodiments, with further reference to FIG. 3 to FIG. 7, under a condition that at least two of the antenna modules 300 are connected in series with each other through the serial lines 30a, the touch module 200 is arranged in a same layer as the antenna modules 300 and the serial lines 30a, so as to simplify the manufacturing of the display panel.

In some optional embodiments, at least a part of the antenna modules 300 are located in a layer where the touch module 200 is located, that is, the touch module 200 and at least a part of the antenna modules 300 are arranged in a same layer, so that the touch module 200 and the antenna modules 300 can be manufactured together, the manufacturing of the antenna modules 300 can be simplified, and the efficiency of manufacturing the display panel can be increased.

In some other optional embodiments, the electrode blocks 220 and the touch lines 210 of the touch module 200 may be arranged in a same layer or in different layers. In order to show a positional relationship between the electrode blocks 220 and the touch lines 210 in FIG. 3 and FIG. 7 more conveniently, the electrode blocks 220 and the touch lines 210 are drawn in the layer where the touch module 200 is located, and the electrode blocks 220 and the touch lines 210 may be located in a same film layer or in different film layers.

Optionally, under a condition that the electrode blocks 220 and the touch lines 210 are arranged in a same layer, the touch module 200 is arranged in a same layer as the antenna module 300s or the serial lines 30a, so as to avoid the crosstalk between the antenna signal and the touch signal.

Optionally, the electrode blocks 220, the touch lines 210 and at least one of the antenna modules 300 are arranged in a same layer, so that the antenna module 300, the electrode blocks 220 and the touch lines 210 can be manufactured at the same time in a same process step, and the efficiency of manufacturing the display panel can be further increased.

Optionally, the serial lines 30a, the electrode blocks 220, the touch lines 210, and at least one of the antenna modules 300 are arranged in a same layer, so that the antenna module 300, the serial lines 30a, the electrode blocks 220 and the touch lines 210 can be manufactured at the same time in a same process step, and the efficiency of manufacturing the display panel can be further increased.

Optionally, under a condition that the electrode blocks 220 and the touch lines 210 are arranged in different layers, one of the antenna modules 300 and the serial lines 30a is arranged in a same layer as the touch lines 210, and the other one of the antenna modules 300 and the serial lines 30a is arranged in a same layer as the electrode blocks 220. For example, at least one of the antenna modules 300 and the electrode blocks 220 may be arranged in a same layer, and the serial lines 30a and the touch lines 210 are arranged in a same layer; alternatively, the antenna modules 300 and the touch lines 210 are arranged in a same layer, and the serial lines 30a and the electrode blocks 220 may be arranged in a same layer, so that the antenna modules 300 can be arranged without adding a layer structure, the layer structure and the wiring structure of the display panel can be simplified, and a thickness of the display panel can be reduced.

Figure 7:
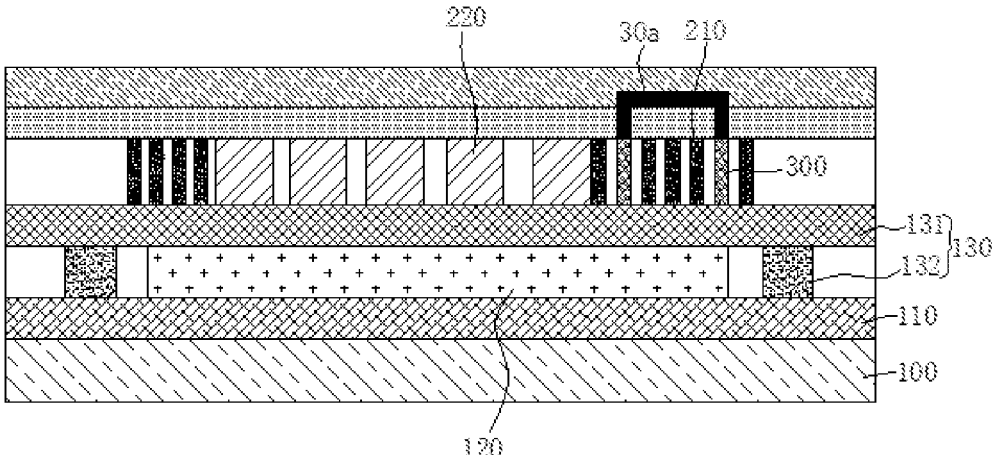
FIG. 7 is a cross-sectional view at A-A in FIG. 1 of another embodiment of the first aspect of the present application.

In some optional embodiments, with further reference to FIG. 7, the antenna modules 300 and the serial lines 30a are arranged in different layers, and the antenna modules 300 and the touch lines 210 are arranged in a same layer. Optionally, the serial lines 30a and the electrode blocks 220 may be arranged in a same layer (not shown in the figure). Optionally, the touch lines 210 are located in the non-display area NA, accordingly, the touch lines 210 are generally made of a metal material with a relatively low impedance. The electrode blocks 220 are located in the display area AA, and the electrode blocks 220 are generally made of an indium tin oxide (ITO) material with a relatively high light transmittance. In other embodiments, the electrode blocks 220 may be formed of a mesh-shaped metal material.

In these optional embodiments, the antenna modules 300 and the touch lines 210 are arranged in a same layer, so that the antenna modules 300 may be made using a same metal material as the touch lines 210, and an impedance of the antenna modules 300 can be reduced, thereby facilitating the signal transmission. The serial lines 30a are configured for connecting with the antenna modules 300 in series, and the length of the serial line 30a is generally relatively short, so that an impedance of the serial line 30a may be reduced by ways of increasing a width of the serial line 30a, and the like.

In some other optional embodiments, the antenna modules 300 and the serial lines 30a may be arranged in a layer different from a layer where the touch module 200 is arranged, so as to avoid the crosstalk between the antenna signal and the touch signal.

Figure 8:
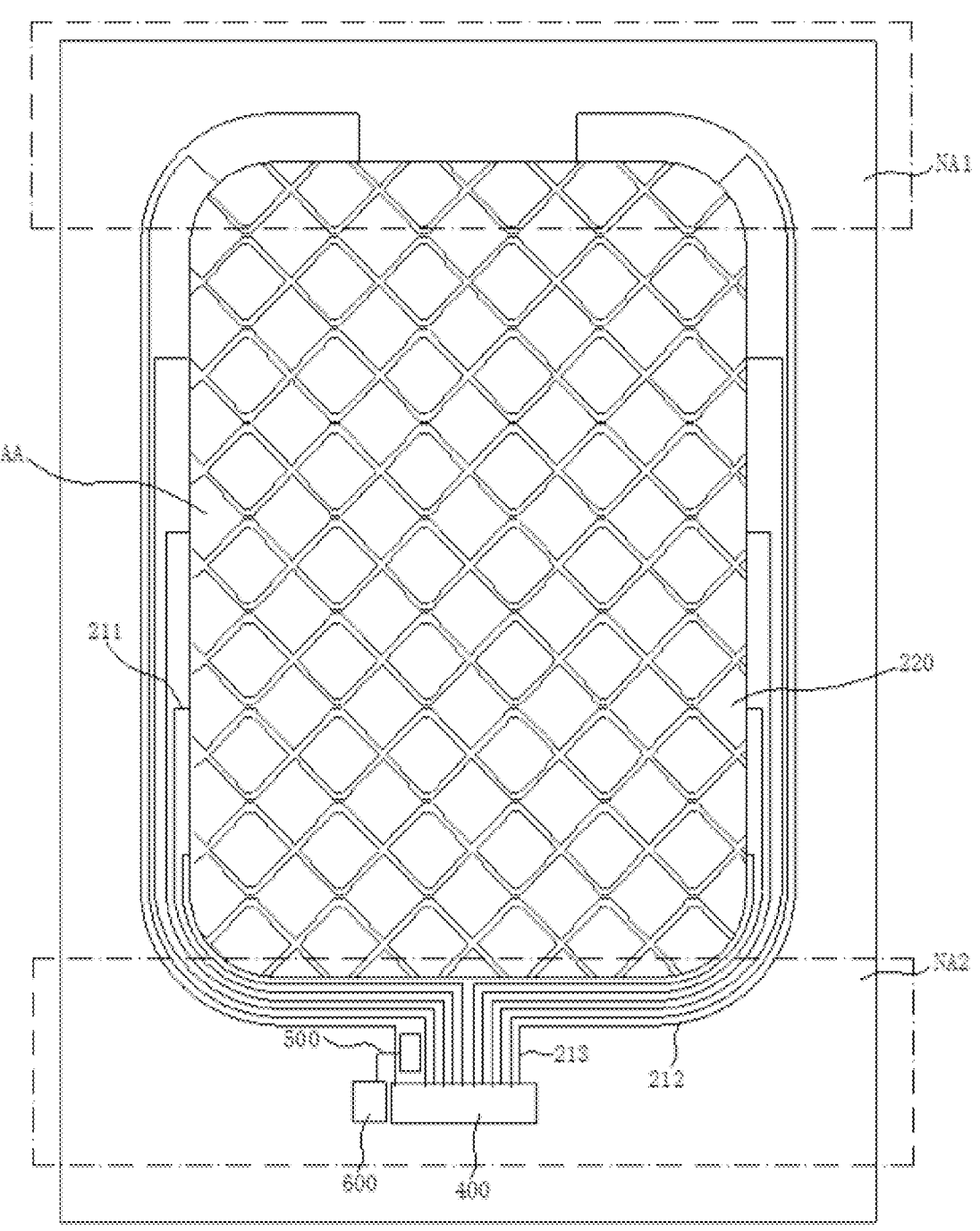
FIG. 8 is a schematic structural view of a display panel according to another embodiment of the first aspect of the present application.
Figure 9:
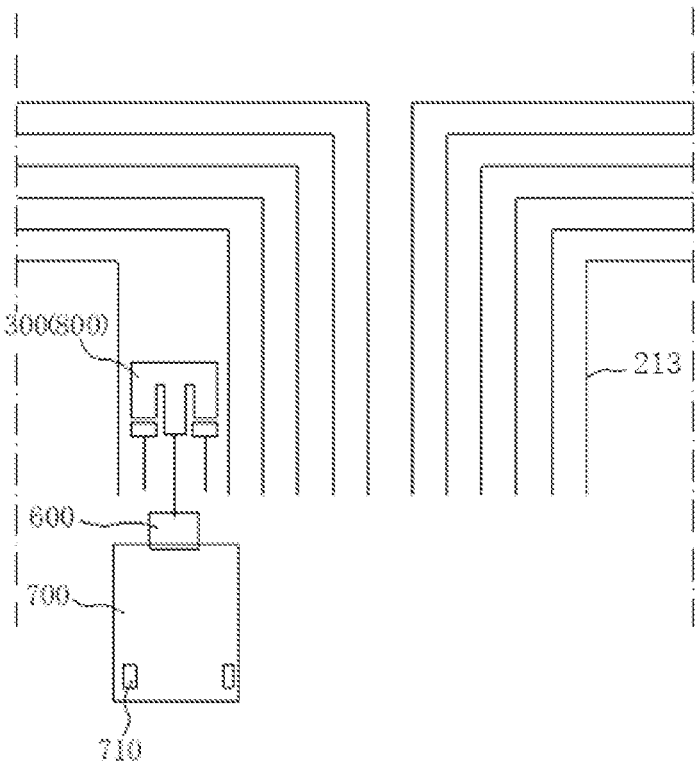
FIG. 9 is a partial enlarged schematic structural view of FIG. 8.

With reference to FIG. 8 to FIG. 9, FIG. 8 is a schematic structural view of a display panel according to another embodiment of the first aspect of the present application. FIG. 9 is a partial enlarged schematic structural view of FIG. 8.

In some other optional embodiments, as shown in FIG. 8 and FIG. 9, dummy lines 800 are arranged in the non-display area NA, and at least a part of the dummy lines 800 are connected with the antenna pad 600 to be reused as the antenna modules 300.

In FIG. 8, the first sub-area NA1 and the second sub-area NA2 are shown in rectangular dot-dash line boxes, the dot-dash lines do not constitute a structural limitation of the embodiments according to the present application, the dot-dash lines only show positions of the first sub-area NA1 and the second sub-area NA2, and the first sub-area NA1 and the second sub-area NA2 are non-display areas NA within rectangular dot-dash line boxes.

Optionally, an orthographic projection of the dummy lines 800 on the substrate 100 is located within orthographic projections of two adjacent second connection segments 213 on the substrate.

In some optional embodiments, the dummy lines 800 are arranged in a same layer as the touch lines 210 and the electrode blocks 220; optionally, the second connection segments 213 and the dummy lines 800 are located in a same layer. Under a condition that the second connection segments 213 are located in the second sub-area NA2, the dummy lines 800 are located in the second sub-area NA2, and the dummy lines 800 and the second connection segments 213 are arranged in a same layer.

Optionally, the dummy lines 800 and at least a part of the antenna modules 300 are located in a same layer, so as to simplify the manufacturing of the antenna modules 300. Optionally, with further reference to FIG. 8 and FIG. 9, at least a part of the dummy lines 800 are connected with the antenna pad 600 to be reused as the antenna modules 300. In order to ensure the uniformity of the wiring of the non-display area NA, in some embodiments, the dummy lines 800 are arranged in the non-display area NA. In the embodiments of the present application, at least one of the dummy lines 800 is reused as the antenna module 300, so that, on one hand, the arrangement of the antenna modules 300 can be simplified, and on the other hand, an electrostatic discharge on the dummy lines 800 and thus affecting the performance of the touch module 200 can be avoided.

As shown in FIG. 8 and FIG. 9, in some optional embodiments, under a condition that the orthographic projection of the dummy lines 800 on the substrate 100 is located between orthographic projections of two adjacent second connection segments 213 on the substrate, the orthographic projection of at least a part of the antenna modules 300 on the substrate 100 is located between orthographic projections of two adjacent second connection segments 213 on the substrate 100, the part of the antenna modules 300 are antenna modules 300 reused by the dummy lines 800. That is, the dummy lines 800 reused as the antenna modules 300 are arranged between two second connection segments 213 that are at least partially adjacent to each other. There is a gap between two adjacent second connection segments 213, and a shape of the gap is uniform and regular, thereby facilitating the arrangement of the dummy lines 800 and the antenna modules 300.

Optionally, the antenna pad 600 and the touch pad 400 are located in the second sub-area NA2, and the antenna modules 300 are electrically connected with the antenna pad 600. Optionally, the antenna modules 300 are electrically connected with the antenna pad 600 through the antenna lines 500. Under a condition that the orthographic projection of the antenna modules 300 on the substrate 100 is located between orthographic projections of two adjacent second connection segments 213 on the substrate 100, the antenna modules 300 are located in the second sub-area NA2, so that a distance between the antenna modules 300 and the antenna pad 600 can be reduced, the length of the antenna lines 500 can be reduced, the signal transmission stability can be improved, and the wiring of the display panel can be simplified.

In some optional embodiments, with further reference to FIG. 9, and in yet some optional embodiments, the display panel further includes an impedance test unit 700 connected with the antenna pad 600 to be reused as the antenna module 300. For example, two or more impedance test terminals 710 are arranged on the impedance test unit 700.

In some optional embodiments, the impedance test unit 700 may be arranged in a same layer or in different layers as the touch lines 210 or the electrode blocks 220; and optionally, the impedance test unit 700 and the touch lines 210 are arranged in a same layer.

Optionally, the antenna modules 300 and the impedance test unit 700 may be arranged in a same layer or in different layers.

Optionally, the impedance test units 700 and at least a part of the antenna modules 300 are located in a same layer, so as to simplify the manufacturing of the antenna modules 300.

In these optional embodiments, an impedance test element may be connected through the impedance test terminal 710, so that an impedance detection loop is formed among the antenna modules 300, the antenna lines 500, the antenna pad 600, the impedance test unit 700 and the impedance test element, and the stability of the circuit connection in the antenna modules 300, the antenna lines 500, the antenna pad 600 and the impedance test unit 700 can be detected. In addition, in the embodiments of the present application, the impedance test unit 700 is reused as the antenna module 300, so that the wiring structure of the display panel can be simplified, the yield of the display panel can be improved, and the efficiency of manufacturing the display panel can be increased.

Optionally, an orthogonal projection of the impedance test unit 700 on the substrate 100 is located between two adjacent second connection segments 213. Under a condition that the impedance test unit 700 and the second connection segments 213 are arranged in a same layer, there is a gap between two adjacent second connection segments 213, and a shape of the gap is uniform and regular, thereby facilitating the arrangement of the impedance test unit 700. A distance between the second connection segments 213 and the antenna pad 600 is relatively short, so that the distance between the impedance test unit 700 and the antenna pad 600 can be reduced, and thus a wiring length between the impedance test unit 700 and the antenna pad 600 can be reduced.

Figure 10:
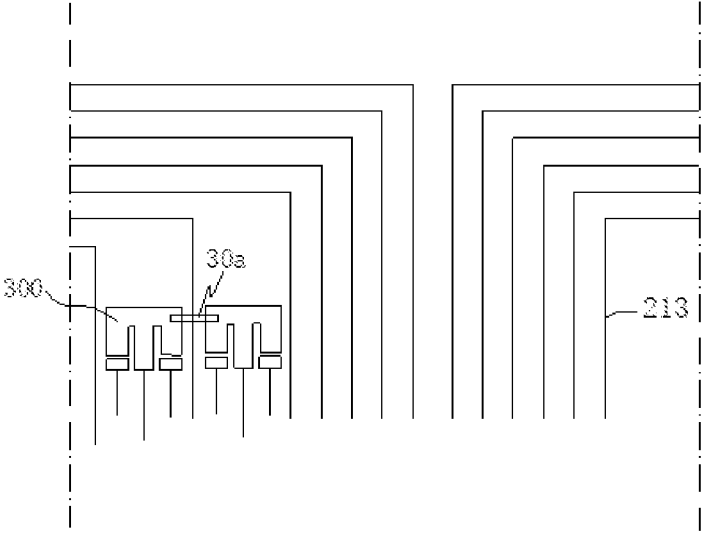
FIG. 10 is a partial enlarged schematic structural view of FIG. 8 according to yet another embodiment of the first aspect of the present application.

With reference to FIG. 10, which is a partial enlarged schematic structural view of FIG. 8 according to yet another embodiment of the first aspect of the present application.

As shown in FIG. 10, optionally, the display panel includes two or more antenna modules 300 connected in series with each other through the serial line 30a, and the serial line 30a may be connected with the radiation electrodes 310 of the antenna modules 300.

In these optional embodiments, two or more antenna modules 300 are connected in series through the serial line 30a, so that a power of the antenna modules 300 can be increased.

Optionally, as shown in FIG. 10, under a condition that the antenna modules 300 are correspondingly located between two adjacent second connection segments 213, and the serial line 30a is configured for connecting with antenna modules 300 at two sides of a same second connection segment 213, the serial line 30a intersects with the second connection segment 213. Optionally, the serial line 30a and the second connection segment 213 are arranged in different layers, that is, the serial line 30a and the touch lines 210 are not located in a same film layer, so as to avoid a short circuit between the serial line 30a and the touch lines 210, thereby improving the yield of the display panel.

Figure 11:
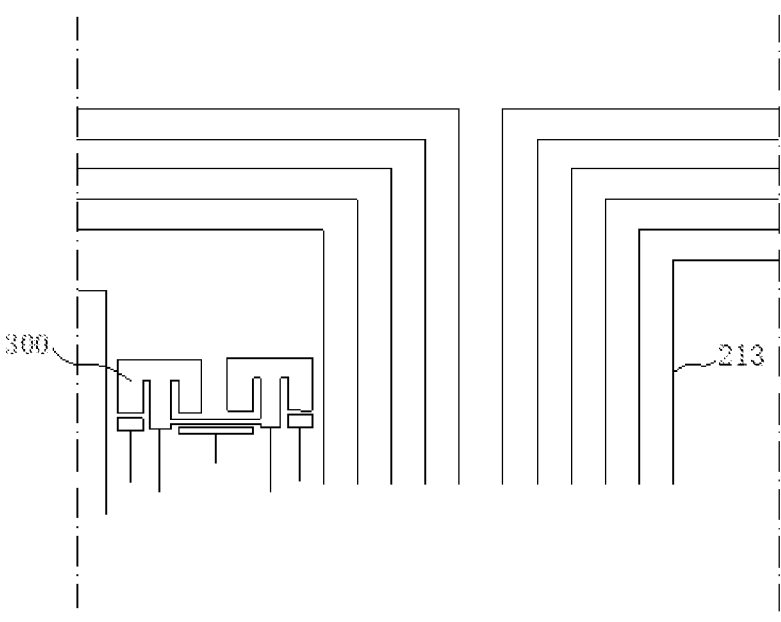
FIG. 11 is a partial enlarged schematic structural view of FIG. 8 according to yet another embodiment of the first aspect of the present application.

With reference to FIG. 11, which is a partial enlarged schematic structural view of FIG. 8 according to yet another embodiment of the first aspect of the present application.

As shown in FIG. 11, optionally, two or more antenna modules 300 may be correspondingly arranged between two adjacent second connection segments 213. These antenna modules 300 may be arranged separately, or as shown in FIG. 10, transmission terminals 330 of two or more antenna modules 300 located between two adjacent second connection segments 213 are connected with each other, so that the two or more antenna modules 300 located between the two adjacent second connection segments 213 are arranged in series with each other.

Figure 12:
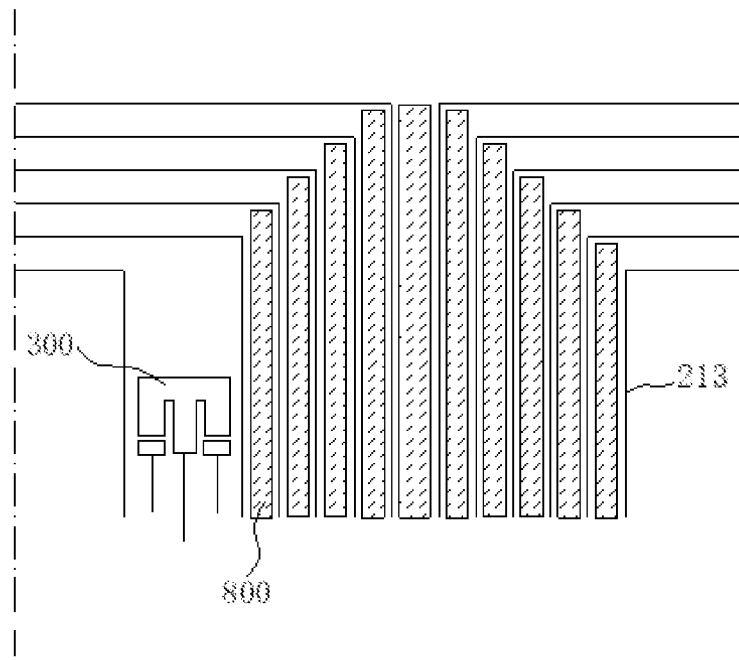
FIG. 12 is a partial enlarged schematic structural view of FIG. 8 according to yet another embodiment of the first aspect of the present application.

With reference to FIG. 12, which is a partial enlarged schematic structural view of FIG. 8 according to yet another embodiment of the first aspect of the present application.

In some optional embodiments, as shown in FIG. 12, the dummy line 800 which is not reused as the antenna module 300 is arranged between two adjacent second connection segments 213, and the antenna modules 300 and other dummy lines 800 which are not reused as the antenna modules 300 may be arranged in a same layer, so as to improve the yield of the display panel, and increase the efficiency of manufacturing the display panel.

Figure 13:
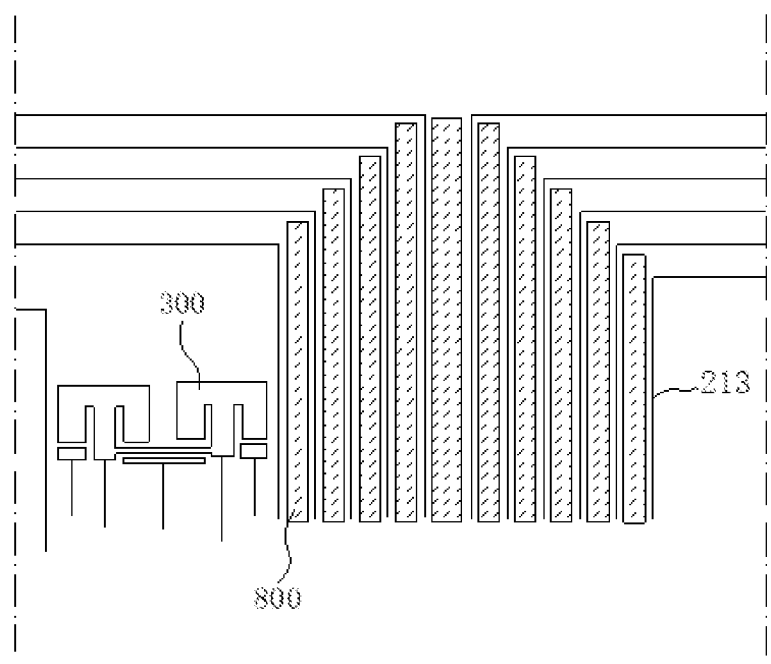
FIG. 13 is a partial enlarged schematic structural view of FIG. 8 according to yet another embodiment of the first aspect of the present application.

With reference to FIG. 13, which is a partial enlarged schematic structural view of FIG. 8 according to yet another embodiment of the first aspect of the present application.

In some optional embodiments, as shown in FIG. 13, an orthographic projection of two or more antenna modules 300 on the substrate 100 is located between orthographic projections of two adjacent touch lines 210 on the substrate 100. That is, two or more antenna modules 300 are correspondingly arranged between two adjacent touch lines 210, so that the number of antenna modules 300 can be increased.

Optionally, with further reference to FIG. 13, the antenna modules 300 correspondingly located between two adjacent touch lines 210 may further be connected in series with each other, so as to increase the power of the antenna modules 300.

Figure 14:
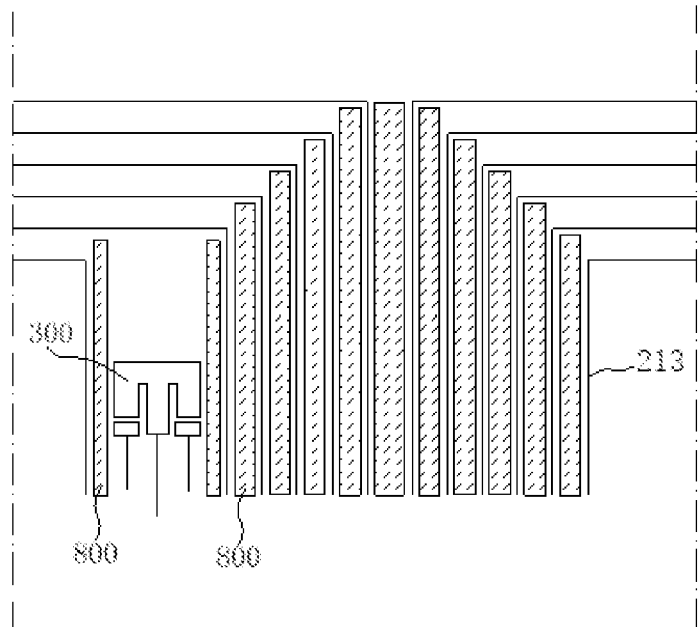
FIG. 14 is a partial enlarged schematic structural view of FIG. 8 according to yet another embodiment of the first aspect of the present application.

With reference to FIG. 14, which is a partial enlarged schematic structural view of FIG. 8 according to yet another embodiment of the first aspect of the present application.

In some optional embodiments, as shown in FIG. 14, the dummy lines 800 may be arranged between the antenna modules 300 and the second connection segments 213, so as to improve the uniformity of the density of the wiring of the array base plate.

The embodiments of the second aspect of the present application further provide a display apparatus including the display panel according to any of the embodiments of the first aspect. Since the display apparatus according to the embodiments of the second aspect of the present application includes the display panel according to any of the embodiments of the first aspect, the display apparatus according to the embodiments of the second aspect of the present application has the beneficial effects of the display panel according to any of the embodiments of the first aspect, which will not be repeated herein.

The display apparatus according to the embodiments of the present application includes, but is not limited to, a mobile phone, a personal digital assistant (PDA), a tablet computer, an e-book, a television, an entrance guard, a smart fixed-line phone, a console and other devices with a display function.

Although the present application has been described with reference to the preferred embodiments, various modifications can be made thereto and components thereof can be replaced with their equivalents without departing from the scope of the present application. In particular, various technical features described in various embodiments can be combined in any manner as long as there is no structural conflict. The present application is not limited to the specific embodiments described herein, and includes all technical solutions that fall within the scope of the claims.

16

What is claimed is:

1. A display panel, wherein the display panel comprises a display area and a non-display area located on at least one side of the display area, and the display panel comprises:
   a substrate;
   a plurality of antenna modules arranged at a side of the substrate, wherein an orthographic projection of at least one of the antenna modules on the substrate is located within a line winding area of the non-display area,
   a touch module arranged at a side of the substrate and comprising a plurality of touch lines located in the non-display area, and the line winding area comprises a touch line winding area formed by wiring of the touch lines in the non-display area,
   a plurality of antenna lines and an antenna pad, and the antenna modules are connected with the antenna pad through the antenna lines,
   a plurality of dummy lines arranged in the non-display area; and
   at least a part of the dummy lines are connected with the antenna pad to be reused as the antenna modules;
   wherein two or more of the plurality of antenna modules are connected in series with each other through serial lines
   wherein the electrode blocks, the touch lines, and the plurality of antenna modules are arranged in a same layer;
   wherein each antenna module comprises of a radiation electrode, ground terminals and a transmission terminal,
   wherein the serial lines are directly connected between the radiation electrodes of the two or more of the antenna modules that are connected in series with each other,
   wherein the serial lines are arranged in a layer different from the electrode blocks, the touch lines, and the plurality of antenna modules, and
   wherein the serial lines overlap at least one touch line of the touch lines.

2. The display panel according to claim 1, and the orthographic projection of the plurality of antenna modules on the substrate is located within the touch line winding area of the non-display area.

3. The display panel according to claim 2, wherein the touch module further comprises electrode blocks located in the display area, the orthographic projection of the plurality of antenna modules on the substrate is located within orthographic projections of two adjacent ones of the touch lines on the substrate, the orthographic projection of the plurality of antenna modules on the substrate is located between an orthographic projection of the electrode blocks on the substrate and an orthographic projection of the touch lines on the substrate.

4. The display panel according to claim 3, wherein the touch module further comprises a touch pad located in the non-display area; and the electrode blocks comprise a plurality of touch electrode blocks, the touch line comprises a first connection segment, a second connection segment, a wiring segment located between the first connection segment and the second connection segment, the first connection segment is connected with the touch electrode block, the second connection segment is connected with the touch pad, and an orthographic projection of at least a part of the antenna modules on the substrate is located between orthographic projections of two adjacent ones of the first connection segments or the second connection segments on the substrate.

5. The display panel according to claim 4, wherein the orthographic projection of at least the part of the antenna modules on the substrate is located between the display area and an orthographic projection of the wiring segments on the substrate.

6. The display panel according to claim 4, wherein the electrode blocks further comprise at least one spacer electrode block located between touch electrode blocks corresponding to two first connection segments that are at least partially adjacent to each other, and the orthographic projection of at least the part of the antenna modules on the substrate is located at a side of the at least one spacer electrode block facing the non-display area.

7. The display panel according to claim 6, wherein the orthographic projection of at least the part of the antenna modules on the substrate is located between an orthographic projection of the at least one spacer electrode block on the substrate and the orthographic projection of the wiring segments on the substrate.

8. The display panel according to claim 4, wherein the non-display area comprises a first sub-area and a second sub-area arranged oppositely along a first direction, the touch pad and the second connection segments are located in the second sub-area, a plurality of second connection segments are arranged side by side along a second direction, and the second direction intersects with the first direction.

9. The display panel according to claim 2, wherein an orthographic projection of at least a part of the antenna lines on the substrate is at least partially staggered with an orthographic projection of the touch lines on the substrate.

10. The display panel according to claim 2, wherein the display panel further comprises a plurality of antenna bridges, one end of the antenna bridge is connected with the antenna module, and the other end of the antenna bridge is connected with the antenna line.

11. The display panel according to claim 10, wherein an orthographic projection of the antenna bridges on the substrate intersects with an orthographic projection of at least one of the touch lines on the substrate.

12. The display panel according to claim 2, wherein the display panel further comprises an impedance test unit connected with the antenna pad to be reused as the antenna module.

13. The display panel according to claim 2, wherein the display panel further comprises a light-emitting unit arranged on the substrate and an encapsulation layer configured for sealing the light-emitting unit, and the antenna modules and the touch module are located at a side of the encapsulation layer away from the substrate; the encapsulation layer comprises an encapsulation cover plate and a ring-shaped encapsulation part arranged at a side of the encapsulation cover plate facing the light-emitting unit, and the antenna modules are correspondingly located within the ring-shaped encapsulation part.

14. A display apparatus, comprising the display panel according to claim 1.

* * * * *